US009778792B2

(12) United States Patent
Files et al.

(10) Patent No.: US 9,778,792 B2
(45) Date of Patent: Oct. 3, 2017

(54) INFORMATION HANDLING SYSTEM DESKTOP SURFACE DISPLAY TOUCH INPUT COMPENSATION

(71) Applicant: Dell Products L.P., Round Rock, TX (US)

(72) Inventors: Jace W. Files, Round Rock, TX (US); John T. Morrison, Round Rock, TX (US); Deeder M. Aurongzeb, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 57 days.

(21) Appl. No.: 14/939,508

(22) Filed: Nov. 12, 2015

(65) Prior Publication Data

US 2017/0139535 A1  May 18, 2017

(51) Int. Cl.
  *G06F 3/041* (2006.01)
  *G06F 3/01* (2006.01)
  *G06F 3/042* (2006.01)

(52) U.S. Cl.
  CPC ............ *G06F 3/0418* (2013.01); *G06F 3/013* (2013.01); *G06F 3/0412* (2013.01); *G06F 3/0425* (2013.01)

(58) Field of Classification Search
  CPC .. G06F 1/1686; G06F 3/04886; G06F 3/0418; G06F 2203/04808; G06T 7/73; G06T 2207/10004
  See application file for complete search history.

(56) References Cited

U.S. PATENT DOCUMENTS

| | | | | |
|---|---|---|---|---|
| 8,884,928 B1 * | 11/2014 | Baldwin | ............... | G06F 3/0488 345/173 |
| 2002/0158750 A1 * | 10/2002 | Almalik | .................. | G06F 21/32 340/5.83 |
| 2010/0090983 A1 * | 4/2010 | Challener | ............. | G06F 3/0421 345/175 |
| 2012/0113064 A1 * | 5/2012 | White | .................... | G06F 3/0418 345/178 |
| 2012/0176303 A1 * | 7/2012 | Miyake | .................... | G06F 3/017 345/156 |
| 2013/0162603 A1 * | 6/2013 | Peng | ..................... | G06F 3/0418 345/178 |

* cited by examiner

*Primary Examiner* — Shaheda Abdin
(74) *Attorney, Agent, or Firm* — Terrile, Cannatti, Chambers & Holland, LLP; Robert W. Holland

(57) ABSTRACT

An information handling system handling system display corrects touch inputs by determining a viewing angle of an end user who makes a touch input and then applying the viewing angle to determine error introduced to the end user's perception of a displayed image. Active correction initiated by a touch of an end user and based on a sensed position, such as by a three dimensional camera, provides more exact positional inputs for touchscreen display devices that are viewed at increased viewing angles, such as horizontally-disposed desktop displays.

18 Claims, 6 Drawing Sheets

INFORMATION HANDLING SYSTEM DESKTOP SURFACE DISPLAY TOUCH INPUT COMPENSATION

BACKGROUND OF THE INVENTION

Field of the Invention

The present invention relates in general to the field of information handling system touch input management, and more particularly to an information handling system desktop surface display touch input compensation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically present information as visual images at a display device, such as a liquid crystal display (LCD) integrated into or attached as a peripheral device to an information handling system. Generally, a graphics processor accepts information from a main processor and generates pixel values for the display to illuminate an array of pixels with a defined color at each pixel location so that a visual image is presented collectively by the pixels. A display resolution depends upon the number of pixels in the display surface. Display resolution has improved over time to have high definition resolution of 1920×1080 pixels and now to ultrahigh definition 4 k resolution of 4096×2304 pixels. Each increase in display resolution has allowed improved precision for display visual images at a pixel level and increased display dimensions since the dense pixel screens can present acceptable images with increased display sizes.

End users have responded to improved display resolution and larger display dimensions by starting to rely more on displayed information instead of printed information. Many information handling systems support display of visual images at multiple display devices simultaneously. Thus, for example, end users have rapid access to multiple displayed pages of multiple documents at each of plural large display screens so that working from displayed documents tends to be more convenient than working from printed documents. In addition to having increased size and resolution, many displays also now incorporate touchscreen inputs. A touchscreen display provides a direct interface for end users to interact with an information handling system by touching icons, touching a presented keyboard to key inputs, and writing inputs with a writing pad and stylus. One example of touchscreen interfaces that accept end user inputs is a tablet information handling system that has a planar housing with a touchscreen display exposed at one side. Another example is a display device that lays flat on a desktop surface to present information and accept end user inputs as touches on the display screen.

One difficulty with presentation of visual images at a horizontally-disposed touchscreen is that the location of an end user touch at the displayed image may vary based upon the end user's relative angle to the display. For instance, horizontally-disposed desktop displays tend to have more thick protective glass surfaces to help prevent damage to sensitive display elements that present images. The protective upper surface introduces error to an end user's perceived touch point due to the distance between the protective surface and the display below and due to refraction of light as the light passes through the glass. The error generally increases as the end user's viewing angle becomes less perpendicular to the viewing surface, as tends to be the case with horizontally-disposed display devices. Such errors tend to detract from the precision available at high resolution display devices to precisely present information and accept inputs at exact locations since some "slop" has to remain to correct for imprecise presentation of images as perceived by the end user. Some devices, such as the Wacom Cintiq use a calibration scheme when initializing a display to adjust for perceived position errors by having a user touch around a screen to determine the perceived display location. However, such calibration schemes will lose their validity if the end user changes position relative to the calibrated position.

SUMMARY OF THE INVENTION

Therefore, a need has arisen for a system and method which provides an information handling system touchscreen display viewing position compensation for accepting touch inputs.

In accordance with the present invention, a system and method are provided which substantially reduce the disadvantages and problems associated with previous methods and systems for compensating touchscreen display viewing positions for accepting touch inputs. A touch input detected at a display location is applied as an input at a corrected location based upon a corrective factor determined at the time of the input, the corrective factor based at least in part on a position of the user who made the input. For example, correction of an input location to adjust for viewer perception of a displayed output due to surface gap and refractive effects provides the user with an accurate touch input even though the user has touched the display at an unintended location.

More specifically, an information handling system processes information with a processor and memory to generate visual images at a display. The visual images are presented at a horizontally-disposed display having a protective surface disposed over a display panel. The protective surface creates a surface gap and refractive error related to a viewing angle of an end user.

The present invention provides a number of important technical advantages. One example of an important technical advantage is that end user touches at an intended location are attributed to the intended location by automatically applying a correction for protective cover distance and refraction errors. Error correction is determined real time at detection of a touch input by an end user by tracking the end user's position relative to the display with sensors, such as a camera, microphone, accelerometer or touch sensors that indicate the end user's position. Active compensation of touch locations to adjust for viewing angle errors provides end user's with more exact touch inputs for displayed interfaces where viewing angles tend to fall outside of perpendicular, such as for horizontally-disposed desktop displays. Enhanced touch accuracy at increased viewing angles improves end user experience with a touchscreen display horizontally disposed on a desktop surface so that the end user is better able to take full advantage of visual image and touch accuracy when making inputs at the touch display.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information handling system visual information presented as visual images at a touchscreen display have an input position corrected for end user viewing angle of an end user that makes the input, such as to correct for refractive and surface gap errors. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
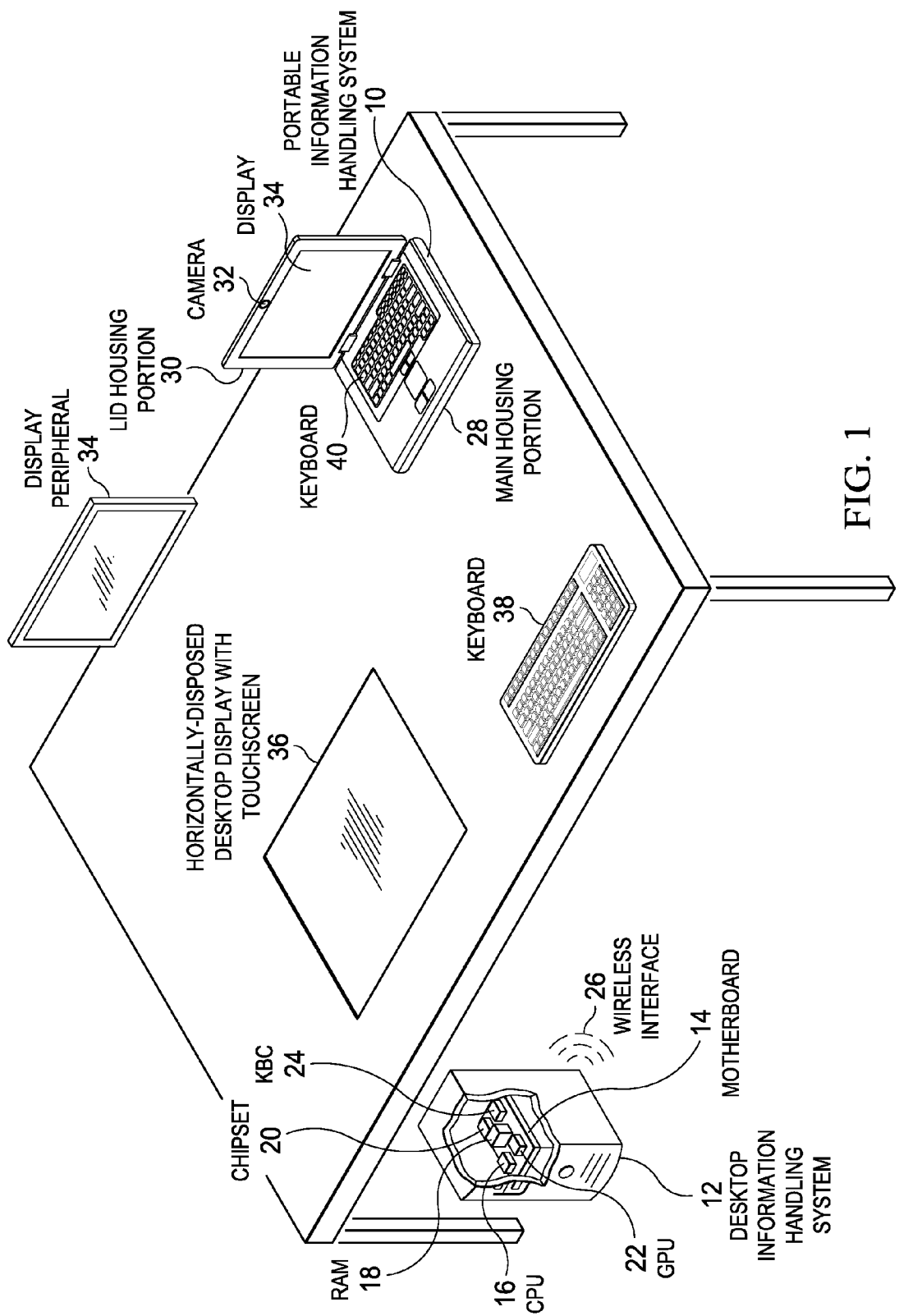
FIG. 1 depicts information handling systems interfaced with a horizontally-disposed desktop display and touchscreen having corrected input positions based on active monitoring of an end user position and/or viewing angle.

Referring now to FIG. 1, information handling systems are depicted interfaced with a horizontally-disposed desktop display and touchscreen 36 having corrected input positions based on active monitoring of an end user position and/or viewing angle. In the example embodiment, a portable information handling system 10 and a desktop information handling system 12 process information with a variety of processing components to generate visual information for presentation to an end user. For instance, a motherboard 14 interfaces a central processing unit (CPU) 16 that executes instructions with random access memory (RAM) 18 that stores the information. A chipset 20 includes a variety of processing hardware components and firmware components store in flash memory that coordinate the storage, communication and presentation of information, such as graphics processor unit (GPU) 22 that generates pixel data for use by a display, a keyboard controller (KBC) 24 that manages input and output device interactions, and a wireless interface 26 that provides wireless communication through wireless local area network (WLAN) and wireless personal area network (WPAN) communications. Portable information handling system 10 is built in a portable housing having rotationally coupled main 28 and lid 30 portions that integrate input/output devices. For example, lid portion 30 includes an integrated display 34 to present visual information and an integrated camera 32 to capture images proximate the display. Main portion 28 includes an integrated keyboard 40 that accepts end user key inputs.

Both portable information handling system 10 and desktop information handling system 12 interact with external peripheral devices, such as through cabled or wireless interfaces. For example, a peripheral keyboard 38 accepts keyed inputs and communicates the keyed inputs through a wireless Bluetooth interface to keyboard controller 24. As another example, a peripheral display 34 accepts pixel information through a DisplayPort cable interface from a graphics processor unit 22 to present visual images. A horizontally-disposed desktop display with touchscreen 36 rests flat on a desktop surface to present visual images provided from the information handling systems and provides touch inputs by an end user to the information handling systems. In one alternative embodiment, desktop display 36 can itself integrate processing components that include an information handling system to generate visual information, instead of acting as a peripheral display of other information handling systems. In either case, an end user can perform inputs by touching display 36 at displayed images to perform an action associated with the displayed images. For instance, pressing on a key of a displayed keyboard inputs that key. An end user can also perform inputs in a writing pad mode, such as with a pen that precisely tracks inputs at the display touchscreen. Of course, the end user inputs at desktop display 36 are only as accurate as the end user's perception of where displayed images are located, and this perception can change based upon the end user's viewing angle relative to display 36, such as due to errors introduced by refraction of display light and errors due to a surface gap between the displayed image and a protective surface over the display.

Figure 2:
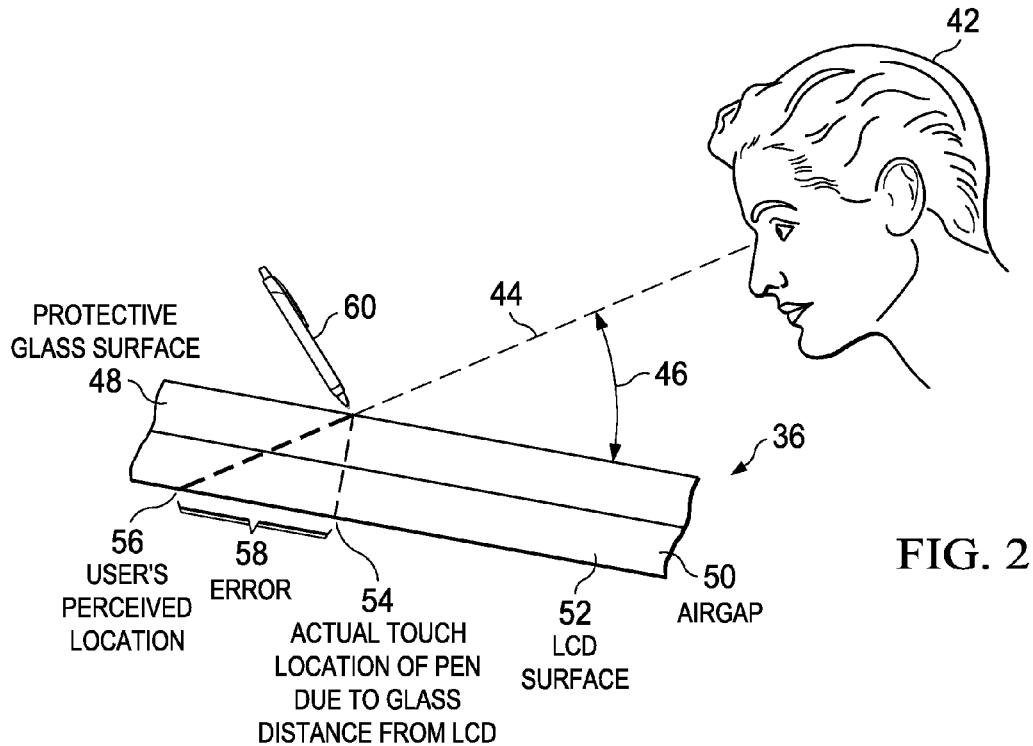
FIG. 2 depicts an example of display touch error introduced by a protective surface glass airgap and user viewing angle.

Referring now to FIG. 2, an example depicts a display touch error 58 introduced by a protective surface glass 48 airgap 50 and user viewing angle 46. An end user 42 has a line of sight 44 to a point that intersects protective glass surface 48, such as the location 54 at which a pen 60 touches surface 48. Airgap 50 causes a displacement of the end user's perceived location 56 determined by traveling the end user's line of sight 44 to the display surface 52 and the end user's actual touch location 54 at which the end user's pen 60 contacts surface 48. The error 58 is the distance between the perceived location 56 and the actual touch 54. The error distance is minimized when the angle of viewing 46 approaches perpendicular relative to the protective surface 48 and increases as the angle of viewing 46 approaches a more parallel angle relative to protective surface 48. In alternative embodiments, alternative configurations of display and touch sensors may be used, such as having the touch sensor at different Z height in the stackup from the display panel surface, such as bonded to the protective cover above the air gap or at intermediate positions of the airgap.

Figure 3:
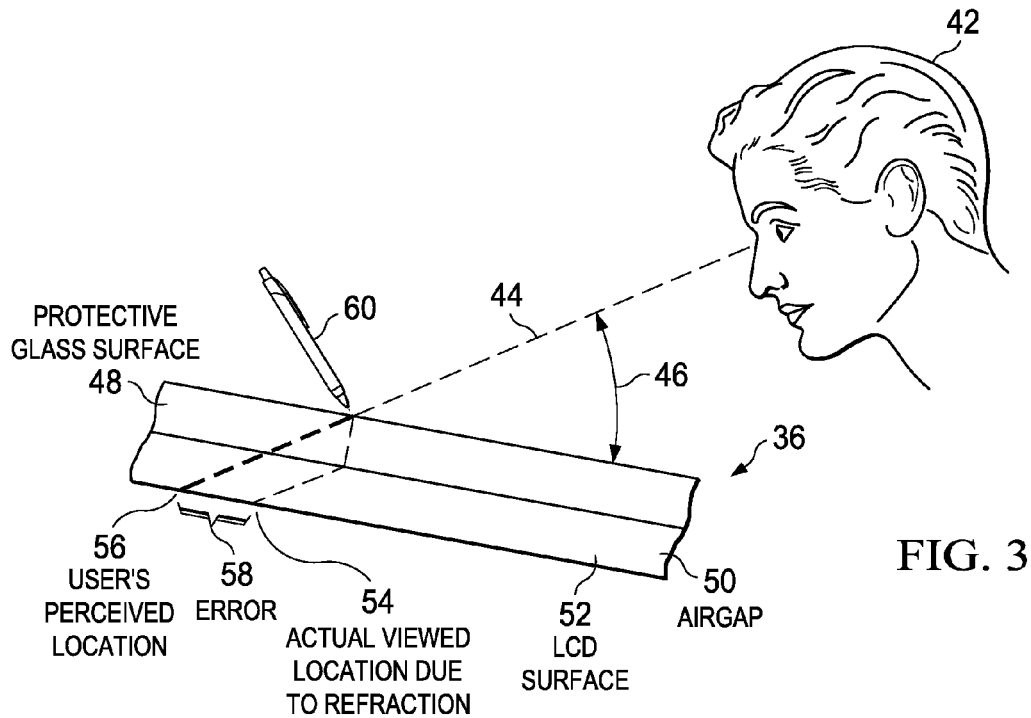
FIG. 3 depicts an example of display refraction error introduced by refraction of light through a protective glass surface at a user viewing angle.

Referring now to FIG. 3, an example depicts a display refraction error introduced by refraction of light through a protective glass surface 48 at a user viewing angle 46. A user's perceived location 56 for touching pen 60 is moved by the effect of refraction as image light from display 52 passes through protective glass 48 so that an error distance 58 is introduced relative to the actual viewed location 54 of the image. Refraction error increases with increase of viewing angle 46 from perpendicular since the amount of glass that the light passes through increases with viewing angle.

Figure 4:
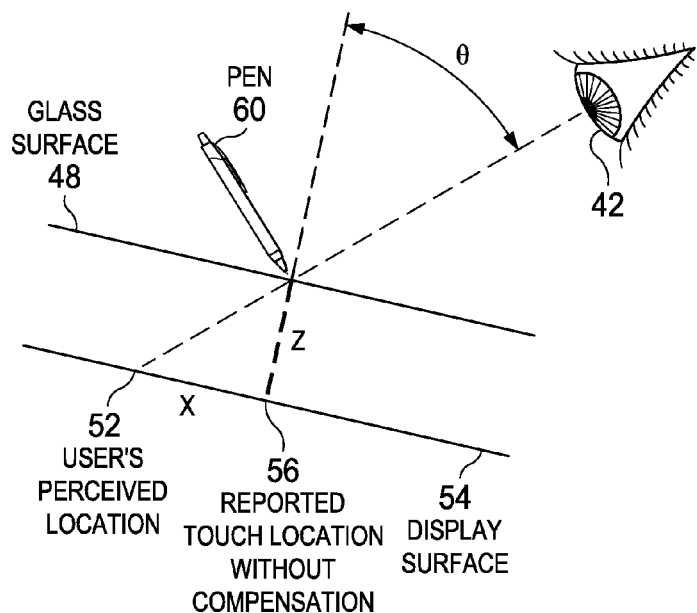
FIG. 4 depicts an example of touch input error correction determined for a protective surface glass gap and user viewing angle.

Referring now to FIG. 4, an example depicts touch input error correction determined for a protective surface glass gap 50 and user viewing angle 46 relative to glass surface 48. In order to compensate for the distance between the touch surface 48, such as a protective glass cover, and the viewing surface 52, such as a display panel of an LCD display, the distance Z between the cover glass surface 48 and the display surface 54 is used to calculate the correction value X where:

$$X = Z \tan \theta.$$

Figure 5:
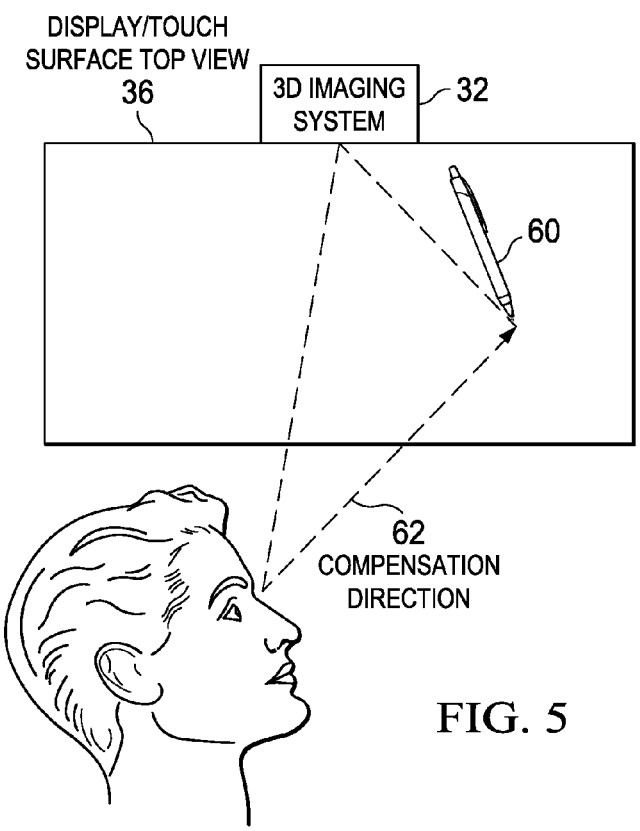
FIG. 5 depicts an example of a touch correction compensation angle determined from an end user viewing angle relative to a touch input location.

Referring now to FIG. 5, an example depicts a touch correction compensation angle determined from an end user viewing angle relative to a touch input location. The compensation distance X needed to correct for protective surface airgap error has a vector with a direction to apply the compensation determined relative to the end user touch location, the sensor 32 location that determines the end user position, and the end user position. As illustrated in the example embodiment, the compensation direction 62 extends from the touch location of pen 60 to the end user location 42. The effect is that a touch on display surface 36 is not counted at an input at the detected input location, but rather shifted by error compensation along vector 62 to count as an input at the location perceived by the end user as the input location for the displayed information.

Refractive error correction is determined in a similar manner as the airgap error correction, however, Snell's Law is applied to determine the compensation distance. Refraction occurs when a light wave travels at an oblique angle from one medium to another medium where the media have different refractive indexes. The phase velocity and wavelength of the light changes while the frequency remains the same. To determine refractive error, the index of refraction of the protective surface and the thickness of the protective surface are applied to pinpoint where on the display surface the user expects that a touch will be relative to a displayed position beneath the protective surface. Applying Snell's Law, the end user's location and the point on the display surface touched by the end user, the correction error is solved from $v_2 \sin \theta_1 = v_1 \sin \theta_2$.

Figure 6:
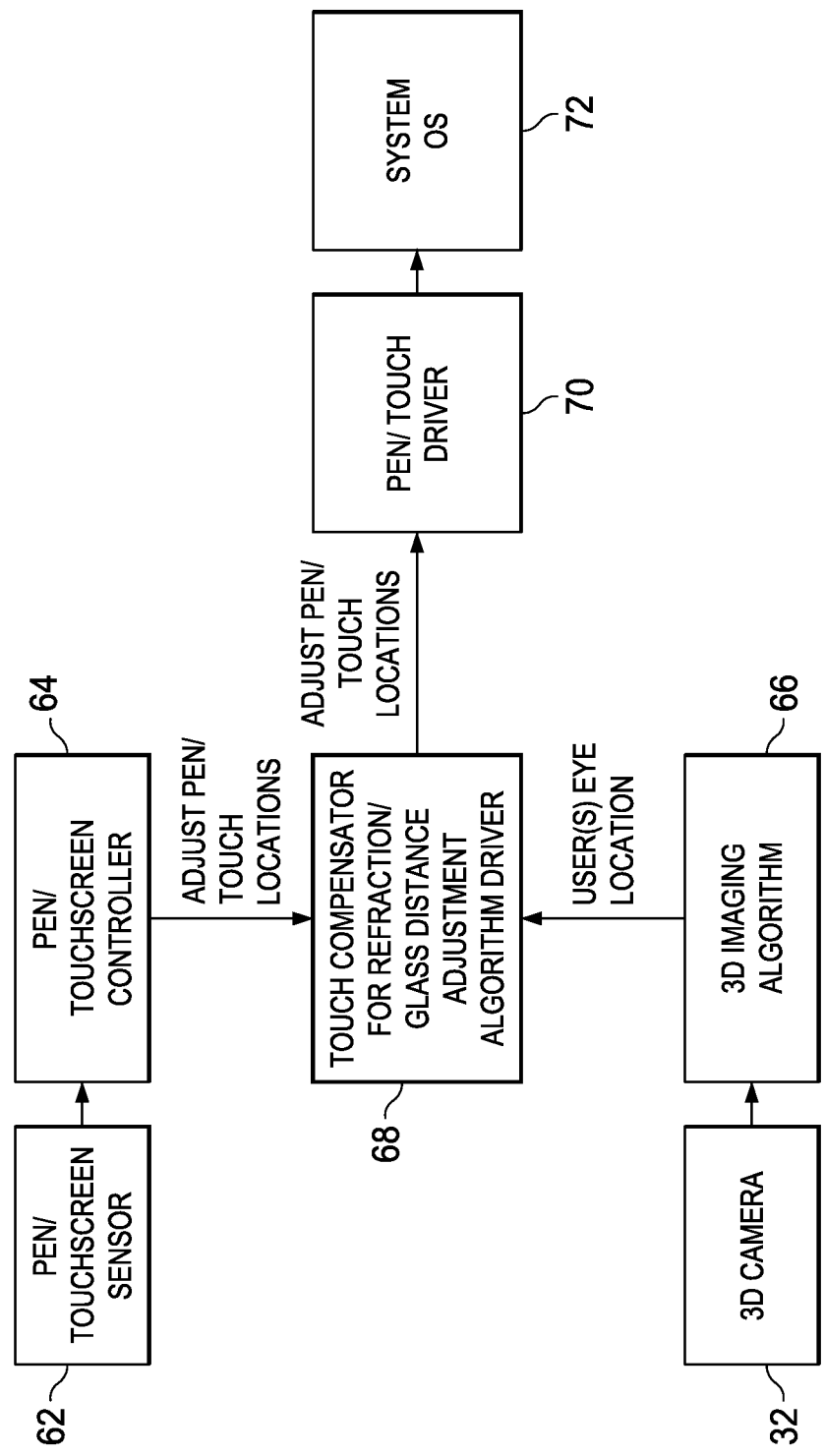
FIG. 6 depicts a logical block diagram of touch correction compensation applied for a detected end user viewing angle.

Referring now to FIG. 6, a logical block diagram depicts touch correction compensation applied for a detected end user viewing angle. The difference between where a user actually places a pen or touches a touchscreen at a protective surface and where on the displayed image the user intends to interact is determined by applying an airgap and/or refractive error correction based upon a sensed user viewing angle determined at the time of the touching with respect to the point on the protective surface the user is looking. In one example embodiment, an image of the user is captured with a camera to determine the viewing angle. For example, a three dimensional camera determines a distance to a user head or other body feature. Alternatively, an infrared camera determines the user position, an iris camera determines the user's eye scan, or other sensors operating together or separately determine the user viewing angle to a touched position. Once the user's angle of viewing at a time of a touch is determined, the location that the information handling system acknowledges the touch event to occur is adjusted for the airgap and refractive error of the viewing angle along a vector of the viewing angle. In particular, determining the viewing angle from the touched position to the end user lends accuracy to touch error correction as opposed to a more general viewing angle for the display device averaged across the whole viewing area.

As depicted in FIG. 6, a pen or touchscreen sensor 62 detects a touch on the touch surface and sends the raw touch data to a pen or touchscreen controller that locates the touch position. Upon detection of a touch, a sensor, such as a three dimensional camera 32 captures an end user position associated with the touch and provides the image information to a three dimensional imaging algorithm 66 to determine the end user position. In one embodiment, camera 32 and position logic 66 remain idle until touches are detected and respond to touches by determining positions traced from the touch to an end user facial feature. In this manner, power is conserved and the correct viewing angle is determined by selecting an end user associated with a touch from multiple end users near the display. A touch compensator 68 applies the end user position and viewing angle information to determine a refractive error and airgap error, and then corrects the touch position to allocate a touch input to a location intended by the end user instead of the actual touch location. The adjusted touch position is passed to a pen or touch drive 70 and then an operating system for use of the touch input at an appropriate application. In the example embodiment depicted by FIG. 6, the logic and instructions for performing the touch detection, end user position detection and touch correction are determined with firmware or software instructions saved in non-transitory memory and executed on processing components, such as the keyboard controller or microcontrollers in the chipset.

Figure 7:
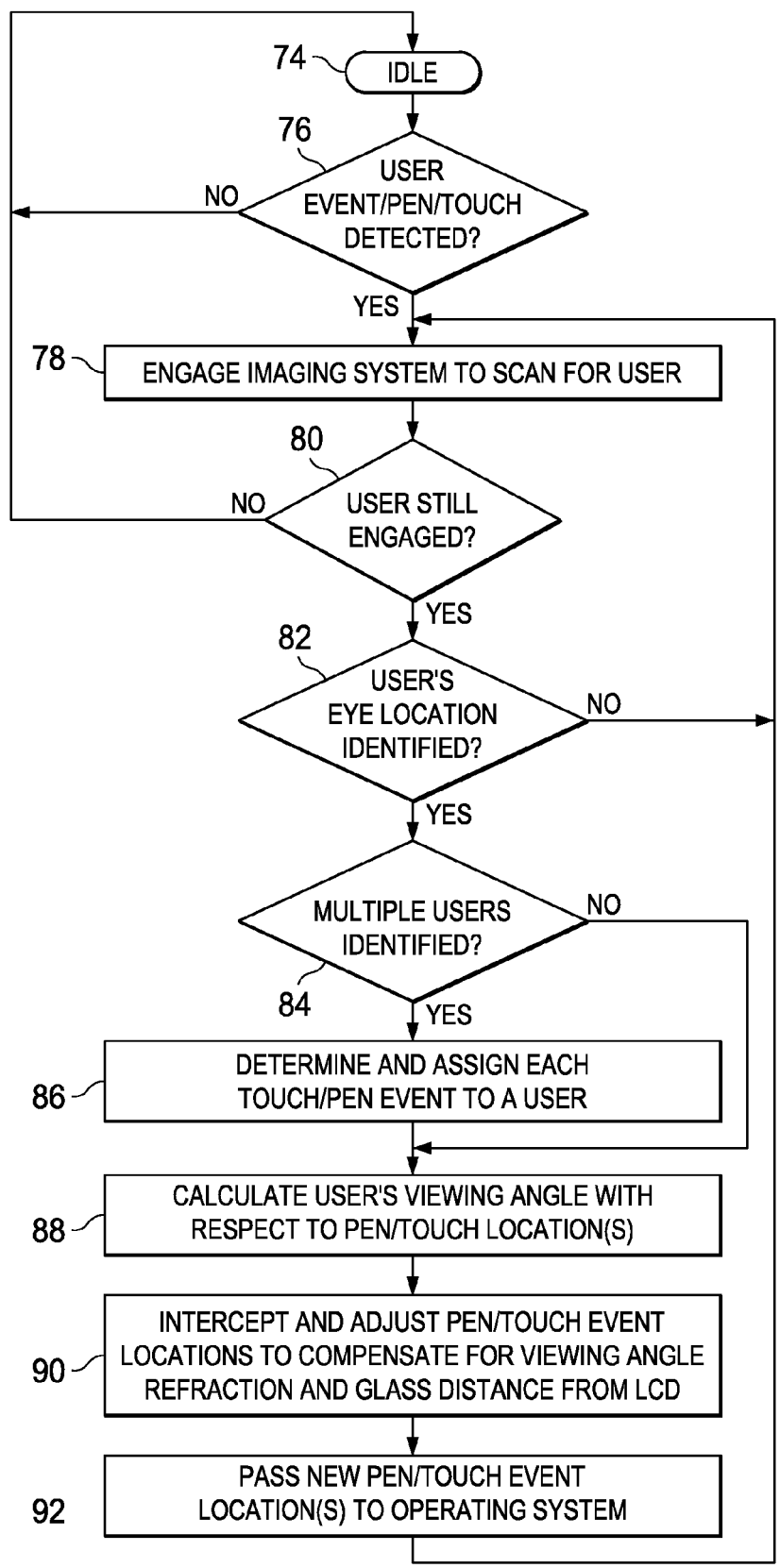
FIG. 7 depicts a flow diagram of a process for correcting an input location based upon a detected end user location and viewing angle.

Referring now to FIG. 7, a flow diagram depicts a process for correcting an input location based upon a detected end user location and viewing angle. The process starts at step 74 in an idle state. Remaining in an idle state in the absence of touch inputs reduces resource allocation and power consumption. At step 76, a determination is made of whether a touch activity was detected. If not the process returns to step 74 to remain idle. Once a touch is detected, the process continues to step 78 to enable and engage the imaging system proximate the display to scan for an end user. At step 80 a determination is made of whether a user is located in the image and, if not, the process returns to the idle state at step 74. If a user is located in the image at step 80, the process continues to step 82 to determine if the user's eye location is available in the image, such as by capturing the facial features of a user or tracking the scan of the user. If the user's eye location is not found, the process returns to step 78 to attempt acquire the eye location. If the eye location is found, the process continues to step 84 to analyze the image and determine if more than one user is present. If more than one user is present, at step 86 the location of each user is determined so that touch inputs attributed to each user individually may have the viewing angle and vector of the user making the touch input used to correct the touch input location.

Once the number of users and their locations are determined, the process continues to step 88 to correct the touch location input by the user to a corrected location intended by the user. At step 88, the user's viewing angle for the user making the input is determined with respect to the touch input location. In various embodiments, the viewing angle may be determined continuously or intermittently, depending on the context of the display. For example, in a context where an end user is writing on a writing pad, the user is likely to change the viewing angle less often so that intermittent updates to viewing angles may be used. As another example, in a context where a user is playing a game that presents information across an entire display space, continuous tracking may be used as inputs by the user may vary suddenly in the display space. Similarly, if multiple users are present at the display, continuous or more frequent tracking may be used so that the user making the input is readily detected. At step 90, the touch input location reported by the display is intercepted at the display driver and compensated for the detected viewing angle to correct for refraction and protective surface gap errors. The compensated touch location is then provided to the operating system as the actual touch position of the end user.

Figure 8:
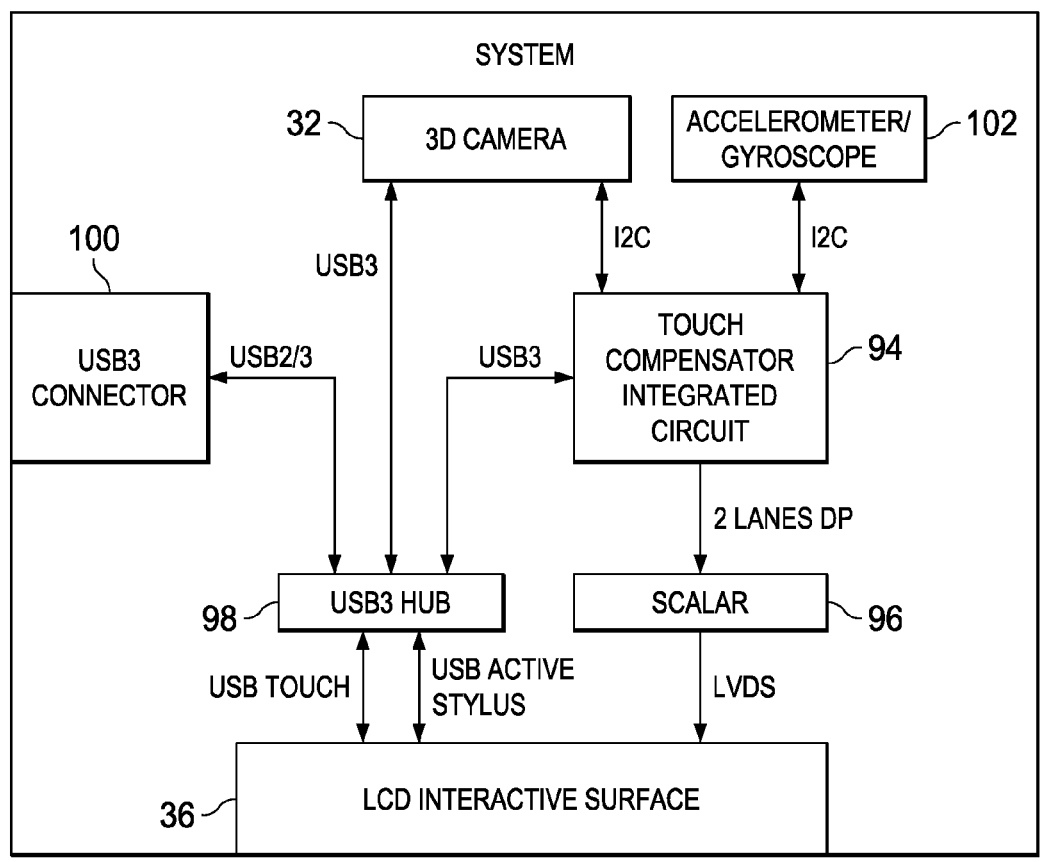
FIG. 8 depicts a circuit block diagram of system that adjusts a touch location to correct for end user perception errors related to viewing angle.

Referring now to FIG. 8, a circuit block diagram depicts a system that adjusts a touch location to correct for end user perception errors related to viewing angle. Images are presented on LCD interactive surface 36 with pixel data provided from scalar 96. Touches to display 36 are communicated to a USB hub 98. External displays or touch devices may interact with USB hub 98 through a peripheral USB connector 100. A three dimensional camera 32 is controlled through communications with a USB driver through USB hub 98. A touch compensator integrates circuit 94, such as a system on chip design, interfaces with touch inputs through a USB interface and obtains position information from camera 32 through an I2C interface. In the example embodiment, an accelerometer/gyroscope 102 also interfaces with touch compensator 94, such as through an I2C interface. In operation, touch compensator 94 receives input locations from display 36 through USB hub 98 and user position information from camera 32 through the I2C interface. Touch compensator 94 adjusts detected touch locations based on the viewing angle and sends the adjusted touch locations to the operating system touch driver. Accelerometer 102 provides input to touch compensator 94 to indicate movement of display 36, such as a lifting or titling by an end user. Viewing angle changes may be estimated from accelerometer inputs, such as when a user tilts the display, so that touch input positions remain accurate in the event that touch input position compensation is delayed pending the capture of a user location by an image. For instance, detection of a tilt by accelerometer 94 provides an angle correction that is applied directly to the last detected viewer angle. In embodiments that have gyroscope output, the gyroscope output provides immediate feedback to changes in viewing angle associated with display tilt.

Although the present invention has been described in detail, it should be understood that various changes, substitutions and alterations can be made hereto without departing from the spirit and scope of the invention as defined by the appended claims.

What is claimed is:

1. An information handling system comprising:
   a processor operable to execute instructions to process information;
   a memory interfaced with the processor, the memory operable to store the information;
   a display interfaced with the processor and memory, the display operable to present the information as visual images and to accept touches as inputs at a touch surface;
   a display controller operable to convert touches to inputs for use by the processor;
   a sensor interfaced with the display controller and operable to determine an end user position relative to a touch input location on the display touch surface; and
   a touch compensator interfaced with the display controller and sensor, the touch compensator operable to adjust the touch input location by a direction and distance determined from the end user position by applying a viewing angle of the end user to the touch input location to a determine a gap correction associated with a gap between a protective surface of the display and a display panel disposed under the protective surface.

2. The information handling system of claim 1 wherein the sensor comprises a three dimensional camera aligned to capture an image of the end user, the image having distance information of the end user.

3. The information handling system of claim 1 wherein the sensor comprises an infrared camera.

4. The information handling system of claim 1 wherein the sensor comprises an iris scan camera operable to detect a direction of viewing scan of the end user.

5. The information handling system of claim 1 wherein the touch compensator further applies the viewing angle to the touch input location to determine a refraction error correction associated with refraction of light through the protective surface.

6. The information handling system of claim 5 wherein the touch compensator activates upon detection of a touch and remains idle in the absence of a touch.

7. The information handling system of claim 5 further comprising an accelerometer interfaced with the touch compensator, the touch compensator applying accelerations detected by the accelerometer to adjust the viewing angle.

8. A method for detecting touches input at an information handling system display, the method comprising:
   detecting an end user position relative to a touch input location of a touch input made at the display;
   analyzing the end user position to determine a viewing angle of the end user relative to the touch input location; and
   moving the touch input location to a corrected touch input location by applying the viewing angle of the end user to the touch input location to a determine a gap correction associated with a gap between the protective surface of the display and a display panel disposed under the protective surface.

9. The method of claim 8 further comprising:
   detecting a relative direction of the end user; and moving the touch input location along the relative direction to the corrected touch input location.

10. The method of claim 9 wherein detecting an end user position further comprises capturing an image of the end user with a three dimensional camera.

11. The method of claim 9 wherein detecting an end user position further comprises capturing an image of the end user with an infrared camera.

12. The method of claim 9 wherein detecting an end user position further comprises capturing an image of the end user with an iris scan camera.

13. The method of claim 8 wherein moving the touch input location further comprises:
moving the touch input location by applying the viewing angle of the end user to the touch input location to determine a refraction error correction associated with refraction of light through a protective surface of the display.

14. The method of claim 8 further comprising:
activating selected of plural components to detect the end user position upon detection of a touch input; and
idling the activated components upon absence of a touch input.

15. The method of claim 8 further comprising:
detecting a change in orientation of the display with a gyroscope disposed in the display; and
adjusting the viewing angle according to the change in orientation.

16. A system for correcting a touch input location at a display, the system comprising:
a display having a protective surface disposed over a display panel and operable to detect touches made at the protective glass surface;
a touch controller interfaced with the display and operable to determine a touch location on the display protective surface relative to images presented at the display panel;
a sensor disposed proximate the display and interfaced with the touch controller, the sensor operable to detect an end user position relative to the display; and
a touch compensator stored in non-volatile memory and operable to execute on the touch controller, the touch compensator operable to apply the end user position to determine a touch position correction for touches made to the protective surface based upon a viewing angle of the end user by applying the viewing angle of the end user to the touch input location to a determine a gap correction associated with a gap between the protective surface of the display and a display panel disposed under the protective surface.

17. The system of claim 16 wherein the touch compensator touch position correction corrects touch location error associated with end user gap and refraction distortion related to the end user viewing angle of images at the touch location.

18. The system of claim 17 wherein the sensor comprises a three dimensional camera.

* * * * *